US011548507B2

(12) United States Patent
Lee et al.

(10) Patent No.: US 11,548,507 B2
(45) Date of Patent: Jan. 10, 2023

(54) CONTROL DEVICE FOR VEHICLE AND CONTROL METHOD FOR VEHICLE

(71) Applicants: JATCO Ltd, Fuji (JP); NISSAN MOTOR CO., LTD., Yokohama (JP)

(72) Inventors: Jonghwan Lee, Seoul (KR); Tomohiro Utagawa, Sagamihara (JP); Chadol Kim, Seoul (KR)

(73) Assignees: JATCO LTD, Fuji (JP); NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 17/413,161

(22) PCT Filed: Nov. 22, 2019

(86) PCT No.: PCT/JP2019/045752
§ 371 (c)(1),
(2) Date: Jun. 11, 2021

(87) PCT Pub. No.: WO2020/121780
PCT Pub. Date: Jun. 18, 2020

(65) Prior Publication Data
US 2022/0032915 A1 Feb. 3, 2022

(30) Foreign Application Priority Data

Dec. 14, 2018 (JP) .............................. JP2018-234834

(51) Int. Cl.
*B60W 30/18* (2012.01)
*B60W 30/188* (2012.01)
(Continued)

(52) U.S. Cl.
CPC .... *B60W 30/18072* (2013.01); *B60W 10/026* (2013.01); *B60W 10/107* (2013.01);
(Continued)

(58) Field of Classification Search
CPC ........ B60W 30/18072; B60W 30/188; B60W 2510/0275; B60W 2510/0647;
(Continued)

(56) References Cited

U.S. PATENT DOCUMENTS 8,696,515 B2 * 4/2014 Yamada .......... B60W 30/18018
477/127
8,771,142 B2 * 7/2014 Watanabe ........... F02N 11/0833
477/54

(Continued)

FOREIGN PATENT DOCUMENTS

| CN | 102476633 A | 5/2012 |
| JP | 2012-051468 A | 3/2012 |
| WO | WO-2017/135174 A | 8/2017 |

OTHER PUBLICATIONS

CN Office Action on non-Foley CN Appl. case related to U.S. Appl. No. 17/413,161 dated Jan. 19, 2022, with translation (15 pages).

*Primary Examiner* — Tinh Dang
(74) *Attorney, Agent, or Firm* — Foley & Lardner LLP

(57) ABSTRACT

A controller includes a control unit which is configured to execute a coast stop control. The coast stop control is configured to perform automatic stopping of the drive source while the vehicle is traveling, when a permitting condition is satisfied, the permitting condition including a condition that a speed ratio R of the variator is lower than a first threshold R1 while the lock-up clutch is in an engaged phase. The control unit is configured to prohibit execution of the coast stop control in a case in which an input-output rotation speed difference of the torque converter is equal to or more than a predetermined value when the lock-up clutch is in the engaged phase.

6 Claims, 3 Drawing Sheets

(51) Int. Cl.
*B60W 10/02* (2006.01)
*B60W 10/107* (2012.01)
(52) U.S. Cl.
CPC ... *B60W 30/188* (2013.01); *B60W 2510/0241* (2013.01); *B60W 2510/0275* (2013.01); *B60W 2510/0647* (2013.01); *B60W 2510/0657* (2013.01)
(58) Field of Classification Search
CPC ....... B60W 2510/0657; B60W 10/026; B60W 10/107; B60W 2510/0241
See application file for complete search history.

(56) References Cited

U.S. PATENT DOCUMENTS

| | | | |
|---|---|---|---|
| 9,334,933 B2* | 5/2016 | Aoyama | B60W 10/02 |
| 10,550,937 B2* | 2/2020 | Waku | F16H 61/68 |
| 2012/0053012 A1 | 3/2012 | Yamada et al. | |

* cited by examiner

CONTROL DEVICE FOR VEHICLE AND CONTROL METHOD FOR VEHICLE

TECHNICAL FIELD

The present invention relates to a control device for a vehicle and a control method for a vehicle.

BACKGROUND ART

JP2012-51468A discloses a coast stop control that automatically stops an engine immediately before a vehicle stops, to further improve fuel economy when anti-idling preformed while the vehicle is stopped.

SUMMARY OF INVENTION

When executing the coast stop control, there is a request to return a variator to the lowest speed ratio by until immediately before the vehicle stops, in order to secure restartability of the vehicle (hereinafter, returning the speed ratio of the variator to the lowest speed ratio is called "Low return"). To cause the variator to shift, the variator needs to be rotating; it is difficult to cause the variator to shift in a situation in which the variator is not rotating.

Therefore, depending on a timing that the coast stop control is executed, the Low return may not be accomplished. As such, in a state in which the Low return cannot be accomplished, namely, the speed ratio of the variator is not returned to the lowest speed ratio, startability of the vehicle may worsen.

The present invention is accomplished in view of such technical problem, and an object thereof is to securely accomplish the Low return when executing coast stop control.

According to one aspect of the present invention, a control device for a vehicle configured to control a vehicle provided with: a drive source; and a continuously variable transmission having a torque converter disposed downstream of the drive source, the torque converter having a lock-up clutch, and a variator disposed downstream of the torque converter. The control device includes a control unit configured to execute a coast stop control, the coast stop control configured to perform automatic stopping of the drive source while the vehicle is traveling, when a permitting condition is satisfied, the permitting condition including a condition that a speed ratio of the variator is lower than a first threshold while the lock-up clutch is in an engaged phase. The control unit is configured to prohibit execution of the coast stop control in a case in which an input-output rotation speed difference of the torque converter is equal to or more than a predetermined value when the lock-up clutch is in the engaged phase.

According to this aspect, it is possible to securely accomplish the Low return.

DESCRIPTION OF EMBODIMENTS

An embodiment of the present invention will be described below with reference to accompanying drawings.

Figure 1:
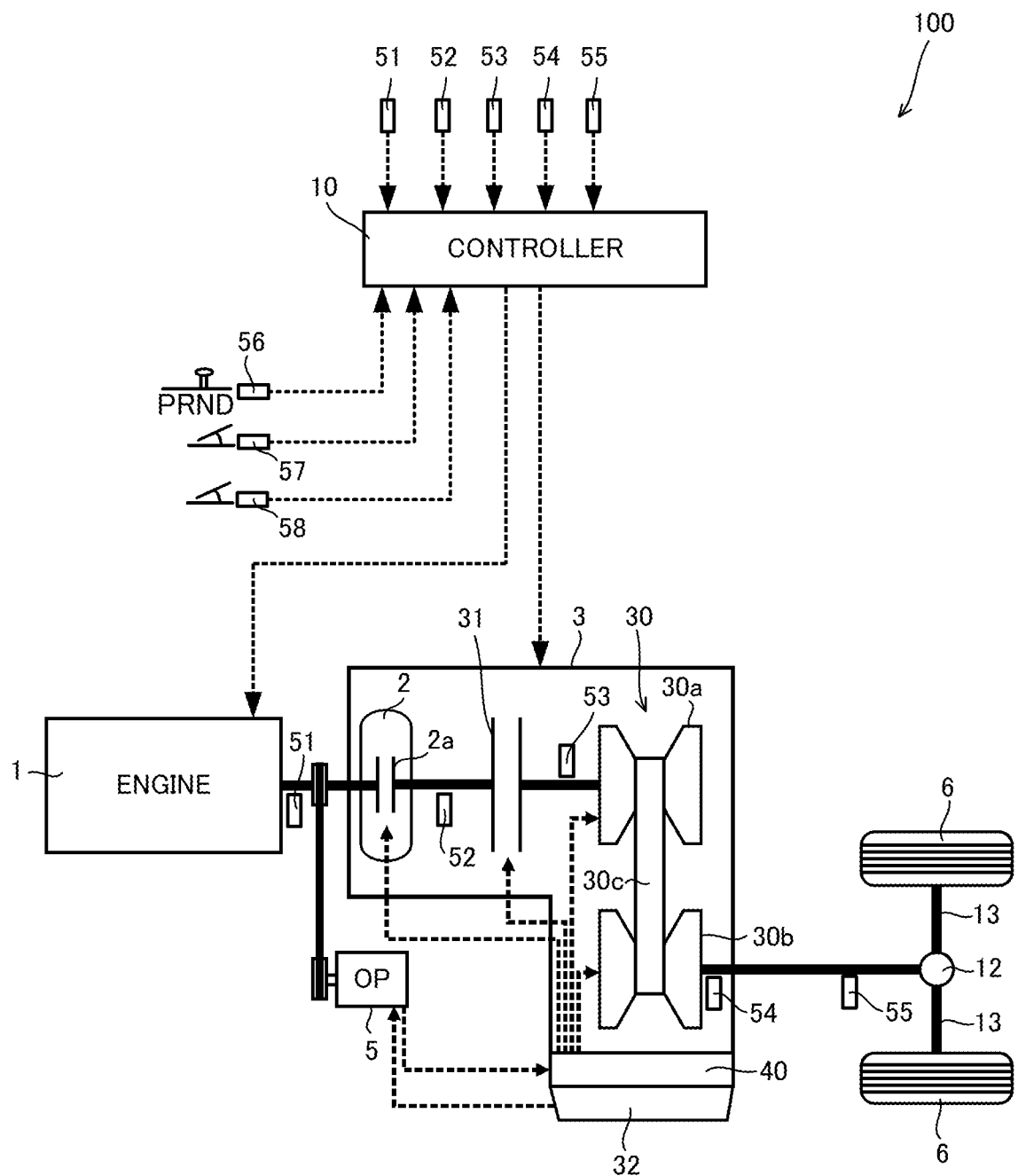
FIG. 1 is a schematic diagram of a vehicle according to an embodiment of the present invention.

FIG. 1 is a schematic diagram of a vehicle 100. The vehicle 100 includes an engine 1, an automatic transmission 3 as a continuously variable transmission, an oil pump 5, drive wheels 6, and a controller 10 as a control device.

The engine 1 is an internal combustion engine using gasoline, diesel oil or the like as fuel, and functions as a drive source for traveling. The engine 1 is controlled in rotation speed, torque and the like, on the basis of commands from the controller 10.

The automatic transmission 3 includes a torque converter 2, an engaging element 31, a variator 30, a hydraulic control valve unit 40 (hereinafter, also simply called "valve unit 40"), and an oil pan 32 for storing oil (working oil).

The torque converter 2 is provided on a power transmission path between the engine 1 and the drive wheels 6. The torque converter 2 transmits power via fluid. Moreover, the torque converter 2 can enhance power transmission efficiency of driving force from the engine 1 by engaging a lock-up clutch 2a.

The engaging element 31 is disposed on the power transmission path between the torque converter 2 and the variator 30. The engaging element 31 includes a forward clutch and a reverse brake not illustrated. The engaging element 31, on the basis of a command from the controller 10, is controlled by oil being pressure controlled by the valve unit 40, with a discharging pressure of the oil pump 5 serving as an original pressure. As the engaging element 31, a normally open multiplate wet clutch is used, for example.

The variator 30 is disposed on the power transmission path between the engaging element 31 and the drive wheels 6, and changes a speed ratio steplessly in accordance with the vehicle speed, accelerator pedal opening and the like. The variator 30 includes a primary pulley 30a, a secondary pulley 30b, and a belt 30c wound around both pulleys 30a, 30b. The speed ratio is changed steplessly by moving a movable pulley of the primary pulley 30a and a movable pulley of the secondary pulley 30b in an axis direction by pulley pressure, to change a pulley contact radius of the belt 30c. The pulley pressure acting on the primary pulley 30a and the pulley pressure acting on the secondary pulley 30b are pressure controlled by the valve unit 40, with the discharging pressure from the oil pump 5 serving as the original pressure.

An output shaft of the secondary pulley 30b of the variator 30 is connected with a differential 12 via a final reduction gear mechanism not illustrated. The differential 12 is connected to the drive wheels 6 via a drive shaft 13.

The oil pump 5 is driven by the rotation of the engine 1 being transmitted via the belt. The oil pump 5 is configured of, for example, a vane pump. The oil pump 5 pumps up oil stored in the oil pan 32, and feeds the oil to the valve unit 40. The oil fed to the valve unit 40 is used in driving the pulleys 30a, 30b, driving the engaging element 31, lubricating elements of the automatic transmission 3, and the like.

The controller 10 is configured of a microcomputer including a central processing unit (CPU), a read-only memory (ROM), a random access memory (RAM), and an input-output interface (I/O interface). The controller 10 may be configured of a plurality of microcomputers. More specifically, the controller 10 may be configured of an ATCU that controls the automatic transmission 3, an SCU that controls a shift range, an ECU that controls the engine 1, and the like. It is to be noted that the control unit in the present embodiment is a virtual unit of a function to execute a coast stop control (described later) of the controller 10.

The controller 10 receives signals from a first rotation speed sensor 51 that detects a rotation speed of the engine 1 (=rotation speed on an input side of the torque converter 2 (pump rotation speed Np)), a second rotation speed sensor 52 that detects a rotation speed on an output side of the torque converter 2 (turbine rotation speed Nt)), a third rotation speed sensor 53 that detects an output rotation speed of the engaging element 31 (=rotation speed of the primary pulley 30$a$), a fourth rotation speed sensor 54 that detects a rotation speed of the secondary pulley 30$b$, a vehicle speed sensor 55 that detects the vehicle speed V, an inhibitor switch 56 that detects a selected range (a state of a gearshift lever or gearshift switch that switches between forward, reverse, neutral and parking) of the variator 30, an accelerator pedal opening sensor 57 that detects an accelerator pedal opening APO, a pedal effort sensor 58 that detects a pedal effort of a brake, and the like. The controller 10, on the basis of these signals received, controls various operations of the engine 1 and the automatic transmission 3.

The controller 10, in order to hold down the fuel consumed amount, executes a coast stop control described below.

The coast stop control is a control that automatically stops (coast stops) the engine 1 while the vehicle 100 is traveling at a low vehicle speed range, to hold down the fuel consumed amount. The coast stop control is in common with a fuel cut control that is executed when the accelerator is lifted off in terms that the fuel supply to the engine 1 is stopped, however is different in terms that the lock-up clutch 2$a$ is disengaged to disconnect the power transmission path between the engine 1 and the drive wheels 6, to completely stop the rotation of the engine 1. It should be noted that the fuel cut control executed when the accelerator is lifted off is released when the lock-up clutch 2$a$ is disengaged, and fuel injection is resumed to maintain a self-sustained state of the engine 1.

In executing the coast stop, the controller 10 first judges the following coast stop conditions (a) to (c):

(a): The foot is off the accelerator pedal (accelerator pedal opening APO=0);

(b): The brake pedal is stepped on (brake pedal effort or brake pressure is equal to or more than a predetermined amount);

(c): The vehicle speed V is equal to or less than a predetermined low vehicle speed (for example, 10 to 20 km/h) (predetermined vehicle speed V1). These conditions are, in other words, conditions to judge whether or not the driver intends to stop. The controller 10 judges that the coast stop conditions are satisfied in a case in which all of these conditions (a) to (c) are satisfied.

The lock-up clutch 2$a$ is disengaged in a case in which a lock-up disengaging line (not illustrated) set on the shift map extends across from a high speed side or high rotation side to a low speed side or low rotation side.

At the time of the coast stop control, there is a request to preferably return the speed ratio of the variator 30 to the lowest speed ratio by until immediately before the vehicle stops, in order to secure the startability of the vehicle 100 (hereinafter, returning the speed ratio of the variator 30 to the lowest speed ratio is called "Low return").

Figure 2:
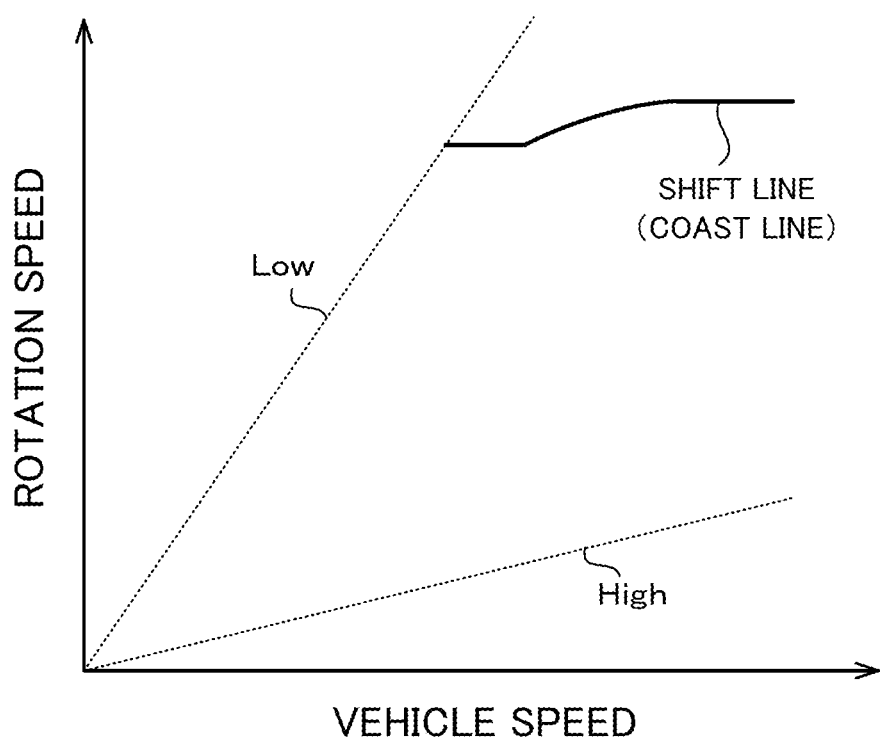
FIG. 2 is a view illustrating one example of a shift line for controlling an automatic transmission according to an embodiment of the present invention.

The Low return is a shift control that changes, in response to a decrease in the vehicle speed V, the speed ratio of the variator 30 to the lower side, namely in a direction in which the speed ratio increases; this is performed by performing a downshift of the variator 30 during coasting that includes the coast stop, in accordance with a coast line illustrated in FIG. 2 (shift line at the time of coasting).

However, in the coast stop, the fuel supply to the engine 1 is stopped; this causes a decrease in flow rate and oil pressure of the oil discharged from the oil pump 5 driven by the power of the engine 1. In a state in which the lock-up clutch 2$a$ is engaged, an engine rotation speed Ne and the turbine rotation speed Nt are equal. On the other hand, when the lock-up clutch 2$a$ is disengaged, the torque transmitted from the engine 1 to the drive wheels 6 (torque caused by coasting of the vehicle 100) decreases. Therefore, in a state in which the lock-up clutch 2$a$ is disengaged, the engine rotation speed Ne decreases quicker than the turbine rotation speed Nt; the flow rate and the oil pressure of the oil discharged from the oil pump 5 decrease quicker than those of the state in which the lock-up clutch 2$a$ is engaged.

Moreover, in a state immediately before the coast stop control is executed, the vehicle speed is low and the accelerator pedal opening is small; thus, a situation insufficient in oil balance easily occurs. With the lock-up clutch 2$a$, a piston thrust is determined from a differential pressure of hydraulic pressures between the front and rear (front and back) of a piston (not illustrated); if the oil balance is insufficient, there is a possibility that the lock-up clutch 2$a$ becomes disengaged even in an engaged phase of the lock-up clutch 2$a$, more specifically, even if an instruction to engage the lock-up clutch 2$a$ is provided from the controller 10, for example.

If the coast stop control is executed in such a situation, the flow rate and oil pressure of the oil discharged from the oil pump 5 becomes insufficient, and the Low return may not be accomplished.

For that reason, in the coast stop control of the present embodiment, in a case in which the lock-up clutch 2$a$ is disengaged even while the lock-up clutch 2$a$ is in the engaged phase, the controller 10 prohibits execution of the coast stop control. The following describes in detail of the coast stop control of the present embodiment, with reference to the flowchart illustrated in FIG. 3.

Figure 3:
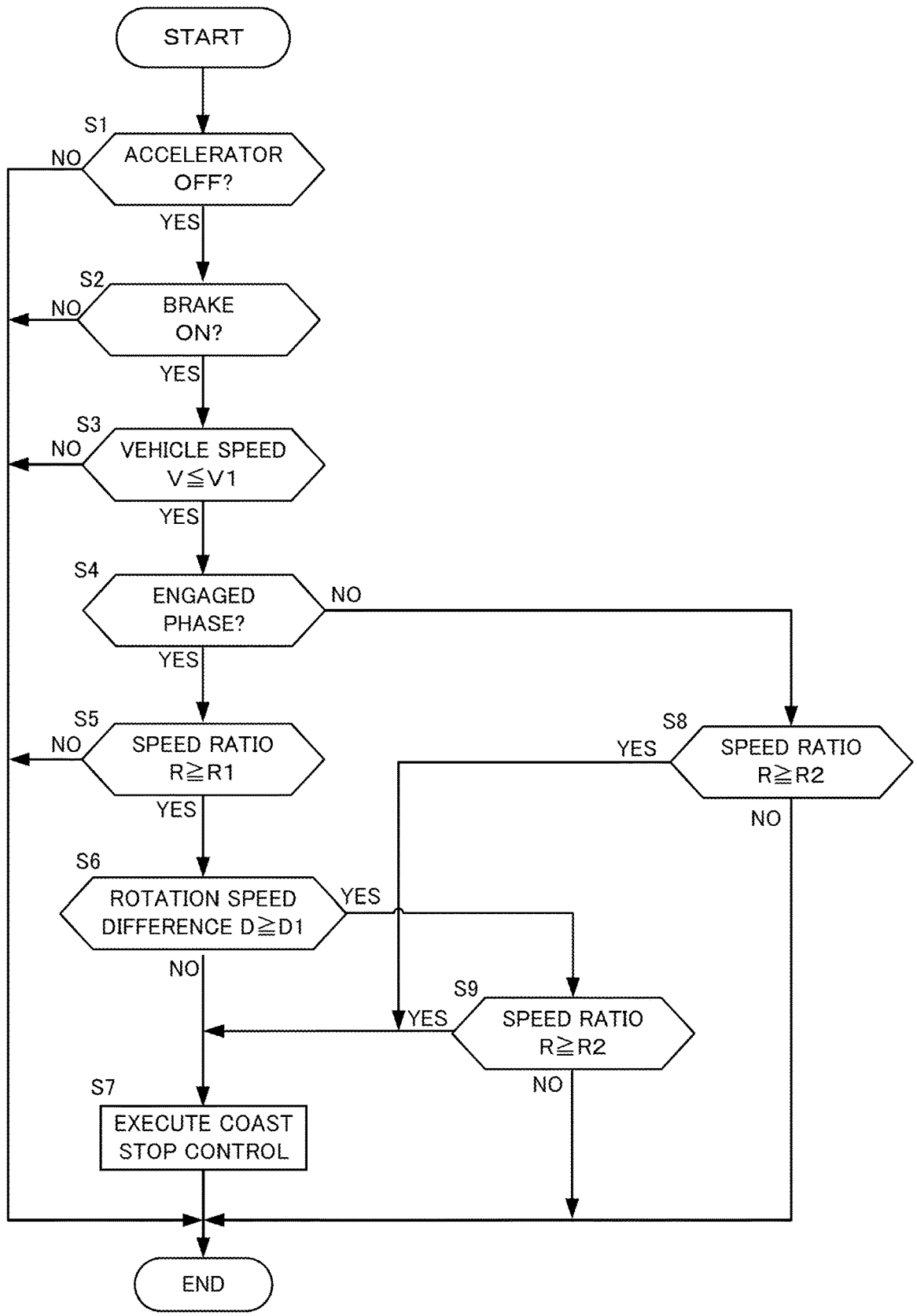
FIG. 3 is a flowchart of a coast stop control according to an embodiment of the present invention.

FIG. 3 is a flowchart of a flow of a control according to the coast stop control in the present embodiment. The coast stop control of the present embodiment is executed by executing a program stored in advance in the controller 10.

In step S1, judgment is made on whether or not the accelerator is OFF. More specifically, the controller 10 judges whether or not the accelerator is OFF on the basis of an accelerator pedal opening APO detected by the accelerator pedal opening sensor 57. If judged that the accelerator is OFF, the process proceeds to step S2. If the accelerator is judged as not OFF, the coast stop condition described above is not satisfied, and thus the process proceeds to END.

In step S2, judgment is made on whether or not the brake is ON. More specifically, the controller 10 judges whether or not the brake is ON on the basis of the pedal effort of the brake detected by the pedal effort sensor 58. If judged that the brake is ON, the process proceeds to step S3. If the brake is judged as not ON, the coast stop condition described above is not satisfied, and thus the process proceeds to END.

In step S3, judgment is made on whether or not the vehicle speed V is equal to or less than a predetermined vehicle speed V1. More specifically, the controller 10 judges whether or not the vehicle speed V is equal to or less than the predetermined vehicle speed V1, on the basis of the vehicle speed V detected by the vehicle speed sensor 55. If the vehicle speed V is judged as equal to or less than the predetermined vehicle speed V1, the process proceeds to step S4. Moreover, if the vehicle speed V is judged as not equal to or less than the predetermined vehicle speed V1, the coast stop condition described above is not satisfied, and thus the process proceeds to END.

In step S4, judgment is made on whether or not the lock-up clutch 2a is in the engaged phase. More specifically, the controller 10 judges whether or not a signal instructing engagement of the lock-up clutch 2a is outputted. If the signal instructing engagement of the lock-up clutch 2a is outputted from the controller 10, the controller 10 judges that the lock-up clutch 2a is in the engaged phase and the process proceeds to step S5. On the other hand, if no signal instructing engagement of the lock-up clutch 2a is outputted from the controller 10, the controller 10 judges that the lock-up clutch 2a is in the disengaging phase and the process proceeds to step S8. The engaged phase means that a driving state (relationship between the vehicle speed V and the accelerator pedal opening APO) is in an engaged range of the lock-up clutch 2a, and the disengaged phase means that the driving state (relationship between the vehicle speed V and the accelerator pedal opening APO) is in an open range of the lock-up clutch 2a.

In step S5, judgment is made on whether the speed ratio R of the variator 30 is equal to or more than a first threshold R1. More specifically, the controller 10 calculates the speed ratio R on the basis of the rotation speed of the primary pulley 30a detected by the third rotation speed sensor 53 and the rotation speed of the secondary pulley 30b detected by the fourth rotation speed sensor 54, and judges whether or not this speed ratio R is equal to or more than the first threshold R1 defined in advance. The first threshold R1 is a threshold of a time in which the lock-up clutch 2a is in the engaged state, and is set as a value that the variator 30 can securely return to the lowest speed ratio when the coast stop control (engine stop) is executed at this point in time.

If the speed ratio R of the variator 30 is equal to or more than the first threshold R1, the process proceeds to step S6. On the other hand, if the speed ratio R of the variator 30 is less than the first threshold R1, the speed ratio R is on a higher side than the first threshold R1; hence, execution of the coast stop control is prohibited (the process proceeds to END).

In step S6, judgment is made on whether or not an input-output rotation speed difference D is equal to or more than a predetermined value D1. More specifically, judgment is made on whether or not a difference (input-output rotation speed difference D) between the pump rotation speed Np being the rotation speed on the input side of the torque converter 2 detected by the first rotation speed sensor 51 and the turbine rotation speed Nt being the rotation speed on the output side of the torque converter 2 detected by the second rotation speed sensor 52 is equal to or more than the predetermined value D1.

The input-output rotation speed difference D being equal to or more than the predetermined value D1 means that the lock-up clutch 2a is in the disengaged state even though a signal instructing engagement of the lock-up clutch 2a is outputted from the controller 10. Therefore, by performing the judgment of step S6, it is possible to accurately judge whether or not the lock-up clutch 2a is engaged. When the input-output rotation speed difference D is equal to or more than the predetermined value D1, the lock-up clutch 2a is unintentionally in the disengaged state; hence, the execution of the coast stop control is once prohibited, and the process proceeds to step S9. On the other hand, when the input-output rotation speed difference D is less than the predetermined value D1, the lock-up clutch 2a is in the engaged state; hence, the process proceeds to step S7 to execute the coast stop control.

Next describes a flow in a case in which the lock-up clutch 2a is judged as in the disengaged phase in step S4 (a case proceeding to step S8).

In step S8, judgment is made on whether or not the speed ratio R of the variator 30 is equal to or more than a second threshold R2. More specifically, the controller 10 calculates the speed ratio R on the basis of the rotation speed of the primary pulley 30a detected by the third rotation speed sensor 53 and the rotation speed of the secondary pulley 30b detected by the fourth rotation speed sensor 54, and judges whether or not this speed ratio R is equal to or more than the second threshold R2 defined in advance. The second threshold R2 is a threshold at a time in which the lock-up clutch 2a is in the disengaged state, and is set to a value on the lower side than the first threshold R1. The second threshold R2 is set as a value that the variator 30 can securely return to the lowest speed ratio when the coast stop control is executed at this point in time.

When the speed ratio R of the variator 30 is equal to or more than the second threshold R2, the speed ratio R is on the lower side than the second threshold R2; hence, the process proceeds to step S7 to execute the coast stop control. On the other hand, when the speed ratio R of the variator 30 is less than the second threshold R2, the speed ratio R is on the higher side than the second threshold R2; hence, execution of the coast stop control is prohibited (the process proceeds to END).

Next describes a flow in a case in which the input-output rotation speed difference D is judged as equal to or more than the predetermined value D1 in step S6 (a case proceeding to step S9).

In step S9, judgment is made on whether or not the speed ratio R of the variator 30 is equal to or more than a second threshold R2. The specific judging method is the same as step S8, and thus explanation thereof is omitted.

When the speed ratio R of the variator 30 is equal to or more than the second threshold R2, the speed ratio R is on the lower side than the second threshold R2; hence, the process proceeds to step S7 to release the prohibition of the coast stop control and execute the coast stop control. On the other hand, when the speed ratio R of the variator 30 is less than the second threshold R2, the speed ratio R is on the higher side than the second threshold R2; hence, prohibition of the execution of the coast stop control is continued (the process proceeds to END).

As described above, in a case in which the lock-up clutch 2a is in the engaged phase and the input-output rotation speed difference D is equal to or more than the predetermined value D1, the execution of the coast stop control is prohibited. However, if the input-output rotation speed difference D is equal to or more than the predetermined value D1, the lock-up clutch 2a is in the disengaged state, namely, is the same as the judgment of NO in step S4. Therefore, even in the case in which the lock-up clutch 2a is in the engaged phase and the input-output rotation speed difference D is equal to or more than the predetermined value D1, if the speed ratio R is equal to or more than the second threshold R2 being the threshold at the time in which the lock-up clutch 2a is in the disengaged state, the prohibition of the execution of the coast stop control is released and the coast stop control is executed. Hence, this allows for increasing the number of executions of the coast stop control.

As such, in the present embodiment, a permitting condition for executing the coast stop control is that the speed ratio R of the variator 30 is equal to or more than the first threshold R1 or the second threshold R2. Accordingly, the coast stop control is executed in the case in which the Low return can be securely executed, in other words, the execution of the coast stop control is prohibited in the case in which the Low return cannot be securely executed. This hence improves the certainty of the Low return.

Moreover, in the present embodiment, in the case in which the input-output rotation speed difference D of the torque converter 2 when the lock-up clutch 2a is in the engaged phase is equal to or more than the predetermined value D1, the execution of the coast stop control is prohibited. As described above, in the state in which the lock-up clutch 2a is disengaged, the flow rate and oil pressure of the oil discharged from the oil pump 5 decreases quicker than in the state in which the lock-up clutch 2a is engaged; hence, if the coast stop control is executed as with the state in which the lock-up clutch 2a is engaged, the Low return may not be accomplished. On this account, in the case in which the input-output rotation speed difference D of the torque converter 2 is equal to or more than the predetermined value D1 regardless of the controller 10 outputting the signal instructing the engagement of the lock-up clutch 2a, the controller 10 judges that the lock-up clutch 2a is not in the engaged state and prohibits the execution of the coast stop control. This enables to improve the certainty of the Low return.

Further, even in such a case, if the speed ratio R is equal to or more than the second threshold R2, prohibiting the execution of the coast stop control is released to execute the coast stop control. Hence, this enables an increase in the number of executions of the coast stop control.

Configurations, actions, and effects of the embodiment of the present invention configured as the above are collectively described.

The controller 10 (control device) of the present embodiment controls the vehicle 100 including a drive source (engine 1) and a continuously variable transmission (automatic transmission 3) having a torque converter 2 disposed downstream of the drive source (engine 1), the torque converter 2 having a lock-up clutch 2a, and a variator 30 disposed downstream of the torque converter 2.

The controller 10 (control device) has a control unit (controller 10) that executes a coast stop control, which coast stop control executes automatic stopping of the drive source (engine 1) while the vehicle 100 is traveling, when a permitting condition is satisfied, which permitting condition includes that the speed ratio R of the variator 30 while the lock-up clutch 2a is in the engaged phase is lower than the first threshold R1. The control unit (controller 10) prohibits the execution of the coast stop control in a case in which the input-output rotation speed difference D of the torque converter 2 when the lock-up clutch 2a is in the engaged phase is equal to or more than the predetermined value D1.

In this embodiment, the permitting condition for executing the coast stop control adds that the speed ratio R of the variator 30 is lower than the threshold (first threshold R1, second threshold R2); it is hence possible to securely perform the Low return.

In the case in which the input-output rotation speed difference D of the torque converter 2 when the lock-up clutch 2a is in the engaged phase is equal to or more than the predetermined value D1, this means that the lock-up clutch 2a is actually disengaged. Accordingly, in this case, even if the lock-up clutch 2a is in the engaged phase, the execution of the coast stop control is prohibited. This can ensure the returnability to Low of the variator 30.

Moreover, the controller 10 (control unit) executes the coast stop control when a permitting condition is satisfied, which permitting condition includes that the speed ratio R of the variator 30 while the lock-up clutch 2a is in the disengaged phase is on the lower side than the second threshold R2, the second threshold R2 being set on the lower side than the first threshold R1.

In the disengaged phase, the lock-up clutch 2a is disengaged; hence, the rotation speed of the input shaft of the lock-up clutch 2a decreases. Accordingly, by using the second threshold R2 set on the lower side than the first threshold R1 as the permitting condition for executing the coast stop control in the disengaged phase, it is possible to execute the coast stop control even at a time in which the lock-up clutch is disengaged. This increases the executing frequency of the coast stop control; hence, it is possible to improve the fuel economy. Furthermore, since the threshold is made variable considering the engaged state of the lock-up clutch 2a, it is possible to improve the certainty of the Low return.

The controller 10 (control unit), even in the case in which the input-output rotation speed difference D of the torque converter 2 when the lock-up clutch 2a is in the engaged phase is equal to or more than the predetermined value D1, releases prohibition of the execution of the coast stop control in the case in which the speed ratio R of the variator 30 is lower than the second threshold R2.

When in the engaged phase, in a case in which the lock-up clutch 2a is disengaged due to insufficient oil balance, this would mean that the lock-up clutch 2a is disengaged. Accordingly, in such a case, the execution or prohibition of the coast stop control is judged by using the second threshold R2 being the threshold at the time when the lock-up clutch 2a is disengaged. This makes it possible to increase the execution frequency without reducing the certainty of the Low return, and hence allows for improving fuel economy.

The controller 10 (control unit) judges whether or not to prohibit the coast stop control by using the first threshold R1, after permitting execution of the coast stop control while the lock-up clutch 2a is in the engaged phase.

In a case of repetitively performing the flow illustrated in FIG. 3, if the judgments from step S4 to S8 are performed in a state in which the speed ratio R has not increased to the second threshold R2 when the lock-up clutch 2a is disengaged, due to the decrease in vehicle speed V after the coast stop control is executed in the lock-up clutch 2a engaged state, the execution of the coast stop control may become prohibited. Accordingly, the controller 10 judges the prohibition of the coast stop control by using the first threshold R1, after the execution of the coast stop control is permitted while the lock-up clutch 2a is in the engaged phase. Hence, it is possible to prevent the execution of the coast stop control from being prohibited carelessly.

The above describes an embodiment of the present invention, however the above embodiment merely illustrates one portion of an application example of the present invention, and does not intend to limit the technical range of the present invention to the specific configurations in the above embodiment.

The controller 10 judges whether or not the lock-up clutch 2a is in the engaged phase or not, however the controller 10 may judge whether or not the lock-up clutch 2a is in the disengaged phase. Since the controller 10 outputs an instruction to disengage the lock-up clutch 2a, the controller 10 can recognize the disengaged phase on the basis of this signal.

This application claims priority based on Japanese Patent Application No. 2018-234834 filed with the Japan Patent Office on Dec. 14, 2018, the entire contents of which are incorporated into this specification.

The invention claimed is:

1. A control device for a vehicle configured to control a vehicle provided with:
   a drive source; and
   an automatic transmission having a torque converter disposed downstream of the drive source, the torque converter having a lock-up clutch, and a variator disposed downstream of the torque converter,
   the control device comprising
   a control unit configured to execute a coast stop control, the coast stop control configured to perform automatic stopping of the drive source while the vehicle is traveling, when a permitting condition is satisfied, the permitting condition including a condition that a speed ratio of the variator is larger than a first threshold while the lock-up clutch is in an engaged phase, wherein
   the control unit is configured to prohibit execution of the coast stop control in a case in which an input-output rotation speed difference of the torque converter is equal to or more than a predetermined value when the lock-up clutch is in the engaged phase.

2. The control device for a vehicle according to claim 1, wherein
   the control unit executes the coast stop control when a permitting condition is satisfied, the permitting condition including a condition that the speed ratio of the variator is larger than a second threshold while the lock-up clutch is in a disengaged phase,
   the second threshold being set larger than the first threshold.

3. The control device for a vehicle according to claim 2, wherein
   the control unit releases prohibition of the execution of the coast stop control in a case in which the speed ratio of the variator is larger than the second threshold, even in the case in which the input-output rotation speed difference of the torque converter is equal to or more than a predetermined value when the lock-up clutch is in the engaged phase.

4. The control device for a vehicle according to claim 2, wherein
   the control unit judges whether or not to prohibit the coast stop control by using the first threshold, after permitting execution of the coast stop control while the lock-up clutch is in the engaged phase.

5. A control method for a vehicle for controlling a vehicle provided with:
   a drive source; and
   an automatic transmission having a torque converter disposed downstream of the drive source, the torque converter having a lock-up clutch, and a variator disposed downstream of the torque converter,
   the method comprising:
   executing a coast stop control configured to perform automatic stopping of the drive source while the vehicle is traveling, when a permitting condition is satisfied, the permitting condition including a condition that a speed ratio of the variator is larger than a first threshold while the lock-up clutch is in an engaged phase; and
   prohibiting execution of the coast stop control in a case in which an input-output rotation speed difference of the torque converter is equal to or more than a predetermined value when the lock-up clutch is in the engaged phase.

6. A control device for a vehicle configured to control a vehicle provided with:
   a drive source; and
   an automatic transmission having a torque converter disposed downstream of the drive source, the torque converter having a lock-up clutch, and a variator disposed downstream of the torque converter,
   the control device comprising
   control means for executing a coast stop control, the coast stop control configured to perform automatic stopping of the drive source while the vehicle is traveling, when a permitting condition is satisfied, the permitting condition including a condition that a speed ratio of the variator is larger than a first threshold while the lock-up clutch is in an engaged phase, wherein
   the control means is configured to prohibit execution of the coast stop control in a case in which an input-output rotation speed difference of the torque converter is equal to or more than a predetermined value when the lock-up clutch is in the engaged phase.

* * * * *